Oct. 24, 1950
J. DAUBER ET AL
2,527,119
AUTOMATIC CONTROL VALVE AND
THE LIKE CONTROL-INDICATOR
Filed Nov. 28, 1947
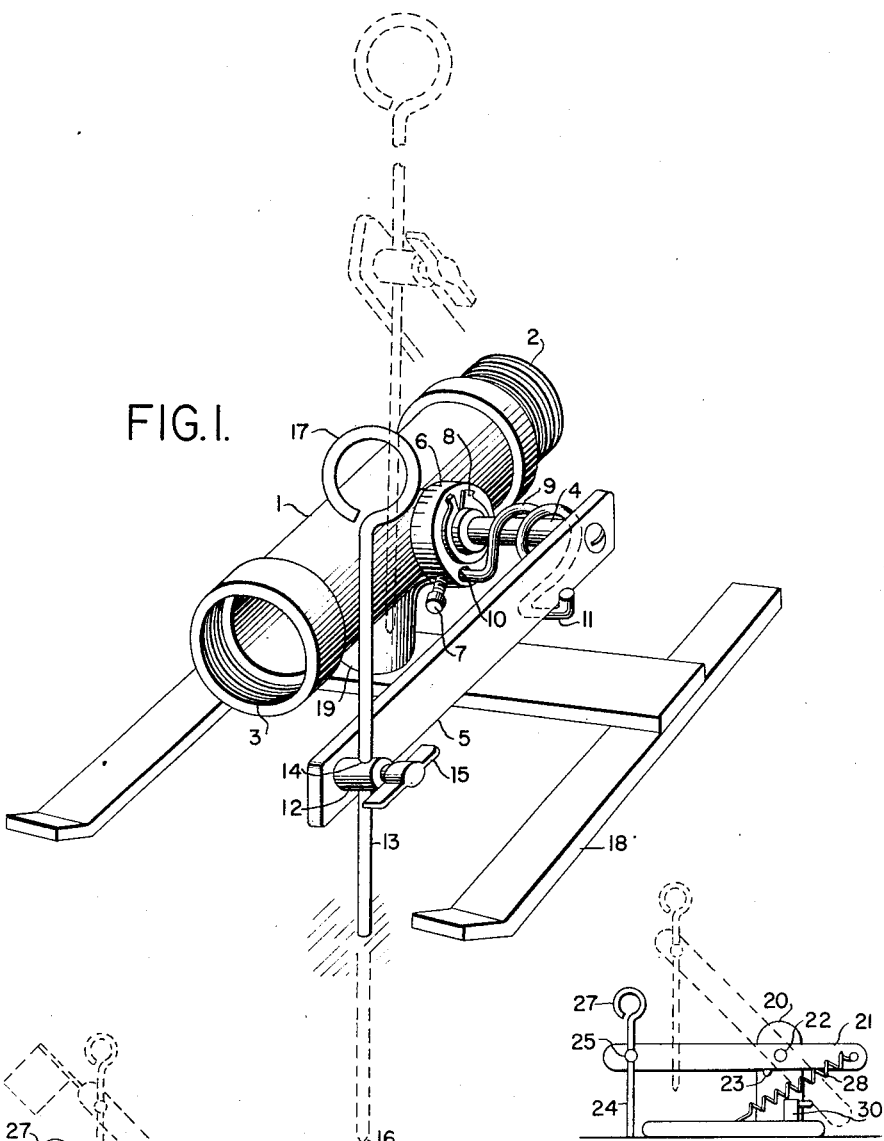
FIG.1.
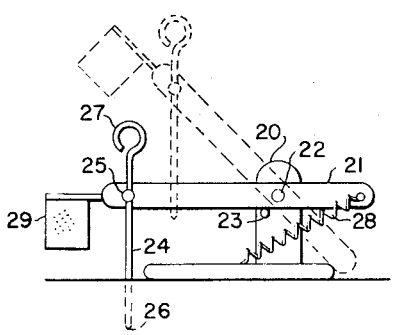
FIG.2.
FIG.3.
INVENTORS
Joseph Dauber
Paul Berndt Patented Oct. 24, 1950

2,527,119

UNITED STATES PATENT OFFICE 2,527,119

AUTOMATIC CONTROL VALVE AND THE LIKE CONTROL INDICATOR

Joseph Dauber, Chicago, and Paul Berndt, Winnetka, Ill.

Application November 28, 1947, Serial No. 788,608

1 Claim. (Cl. 116—114)

This invention relates to indicating and controlling devices which are used in regulating the processing of a material. An important object of the invention is to provide a simple and inexpensive control valve for lawn sprinklers and irrigation systems, which will automatically shut off the water supply when the soil has attained the desired humidity.

Other important objects of the invention are: to provide a device which will indicate changes in the consistency of a material being processed and changes in the material's resistance to the passage through it of a probe; which will give a signal when said resistance falls below some predetermined value; which will alter the processing of the material in accordance with changes in said resistance; and which will throttle the flow of materials and energy to the process in accordance with changes in said resistance.

Other objects and advantages will appear from the following description and from the drawings, in which:

Figure 1 is a perspective view of an automatic control valve device showing the valve in open position.

Figure 2 is a side elevation of an indicator device.

Figure 3 is a side elevation of a combined indicator and switch device.

Some attempts have been made to shut off sprinklers with timing devices of various kinds, but none to our knowledge uses the humidity influenced resistance to mechanical passage of the earth as a responsive medium.

In the embodiment chosen to illustrate our invention in Figure 1 there is provided a quarter turn valve 1 of the usual type seen with water pipe installation to control water, in which ¼ turn in clockwise direction will close the water passage and ¼ turn in counter-clockwise direction as shown in illustration will open water passage. Said valve is provided with a connecting male end 2 for attachment to a garden hose which is connected to the water source, and a connecting female end 3 for attachment to a garden hose and connected to a sprinkler system. The valve stem 4 is fastened to arm 5. A drum 6 is rotatably mounted to the valve body, coaxially with said valve stem 4 and held in place by adjusting screw 7. A lock ring 8 locates said drum axially. Torsion spring 9 is connected to said drum 6 at end 10, and the other end 11 engages said arm 5. Said torsion spring tends to turn said arm 5 and stem 4 in clockwise direction, keeping valve normally closed, the closed position being as shown in dotted lines. Post 12 is pivotally connected to arm 5. Probe 13 of the shape shown in illustration is slidably mounted in hole of said post 14 and held in place by screw 15. To assist the probe in its function a point 16 is provided at the bottom and a loop handle 17 at the top. A sled type support 18 of the shape shown is mounted to valve base 19 for support of said valve.

The operations of our device is as follows: In normal position probe 13 is in a substantially withdrawn position, and arm 5 is in an upright position shown in dotted lines which closes the water passage of said valve. When it is desired to turn on the lawn sprinkler or any other irrigation system, probe 13 is pushed down manually at loop handle 17 into the soil, thereby turning arm 5 and stem 4 counter-clockwise as viewed in Figure 1. The valve passage is thus opened and the sprinkler turned on. In this position said probe 13 will remain substantially anchored in the earth, thus holding the valve 1 open. As the soil becomes increasingly moist, its resistance to withdrawal of the probe diminishes until when the moisture reaches the appropriate depths, the restoring force of the torsion spring 9 withdraws said probe 13 from the soil and closes the valve, thereby cutting off the flow of water. Adjustment of length of probe 13 by means of screw 15 controls the depth of penetration of said probe 13 thereby controlling moisture at the desired depth of soil. Adjustment of spring tension of torsion spring 9 by means of drum 6 and adjusting screws 7 permits calibration of the valve device for different soil consistency.

We prefer, however, the method of operation in which the spring means tends to withdraw the probe from the earth or other material being processed, because this method avoids the possibility of the probe encountering some inhomogeneity (a stone, for example) which would introduce erratic results.

Figure 2 illustrates a form of our indicator which consists of a base stand 20, an arm 21 pivotally mounted to said base stand 20 at 22, a stop-pin 23 protruding below said arm 21, a probe 24, pivotally mounted to said arm at 25, a point 26 at the bottom of the probe and a loop handle 27 at the top, a tension spring 28 which normally holds probe 26 in a withdrawn position as shown in dotted lines, and a signal flag 29 attached to arm 25 to indicate position of probe 26.

In operation said probe 13 is manually inserted into penetrable matter (e. g. earth, cement mixture, etc.) until arm 21 comes to rest against stop pin 23 as shown in Figure 2. In this position said probe 24 will remain substantially anchored in said matter and signal flag 29 will be in a horizontal position. When anchoring ability of said matter falls below its initial value, the restoring force of spring 27 will restore probe 23 and signal flag 29 to their normal position shown in dotted lines in illustration.

It will be apparent that above-described indicator device can be operated by constructing the spring force so that the process will be reversed, causing the probe to move through the matter in a penetrating direction. The indicator would then give its signal when some specified length of the probe is within the matter.

The indicator and switch device illustrated at Figure 3 is substantially the same as shown in Figure 2 except that a switch 30 is mounted to base stand 20, causing arm 21 to contact said switch in normal position and break contact with switch when probe is inserted in matter.

Although we have shown and described certain preferred forms of our invention, it is manifest that our invention is capable of further modifications and rearrangements of parts without departing from its spirit and scope. We wish it to be understood that our invention is not to be limited to the specific forms or arrangements of parts herein described and shown, or specifically covered by our claim.

We claim as our invention:

In an indicator device a probe capable of being inserted into and anchored in penetrable matter, spring means to keep said probe in a position substantially withdrawn from said matter, the restoring force of the spring having such direction and magnitude as to withdraw the probe when said matter's anchoring ability falls below a predetermined value; an indicator member operatively connected to said probe and indicating whether said probe is anchored in said matter or withdrawn.

JOSEPH DAUBER.
PAUL BERNDT.

REFERENCES CITED

The following references are of record in the file of this patent:

UNITED STATES PATENTS

| Number | Name | Date |
| --- | --- | --- |
| 2,347,179 | Gorman | Apr. 25, 1944 |
| 2,445,717 | Richards | July 20, 1948 |